Patented June 28, 1949

2,474,292

UNITED STATES PATENT OFFICE 2,474,292

ADHESIVE TAPE FOR LAMINATING

Charles L. Weidner, New Brunswick, and Laszlo Walter Eger, Perth Amboy, N. J., assignors to Industrial Tape Corporation, a corporation of New Jersey No Drawing. Application August 13, 1943, Serial No. 498,594

3 Claims. (Cl. 117—122)

This invention relates to an adhesive tape for use in laminating materials and to an adhesive used in conjunction therewith. The tape has particular application in the manufacture of plywood and veneered articles.

In plywood manufacture it is customary to glue together the wood sheets which form the individual plies along their adjacent or abutting edges to facilitate handling. Until the glue sets, the wood sheets forming the individual plies are temporarily held together by adhesive tape which is thereafter removed. Removal of the adhesive tape is necessary before the individual layers are plied up, because the adhesives usually used with tapes of this character are of vegetable or animal origin and, being water soluble, would result in a plywood structure having inferior water resisting qualities were the tape allowed to remain in the built up structure. The removal of the tape is costly, as well as time consuming.

More recently a tape has been proposed for this purpose which does not require removal. This tape is resin impregnated but over the layer of resin there is applied a layer of animal glue to satisfy the initial requirements of adherence to the surface of the wood before the resin is set by the application of the heat used to cure the adhesive which joins the multiple plies together. The tape requires the additional layer of animal glue because the resin layer in an uncured state lacks sufficient internal strength when moistened even temporarily to hold the adjacent elements of the individual plies together.

However, the tape just mentioned suffers the disadvantage that the animal glue remains in the plied up structure, and, being water soluble, lowers the water resistance of the completed product. Another disadvantage is one of manufacturing cost. A double coating operation is involved in laying down the resin and the glue on the tape backing.

In accordance with the present invention there is provided an adhesive tape for the purposes set forth and which remains in the finished plywood board without detracting materially from its water resistant properties. Furthermore, only one pass through the adhesive applying device is necessary, so that there is a substantial saving insofar as manufacturing cost is concerned.

In its broader aspect, the improved tape includes a flexible fibrous backing to which there is anchored an adhesive including a solvent sensitizable resin and a film-forming material to impart internal strength.

The resin may be a soluble, heat settable resin, preferably a partially reacted aldehyde condensation polymer such as phenol-aldehyde, a urea-aldehyde, a melamine-aldehyde or homologues, derivatives or mixtures thereof. Under the temperature conditions encountered in bonding sheets of wood into a unitary plywood board, the resinous material is cured or set and thereby rendered a water resistant part of the plywood structure.

However, in themselves, resinous materials of the character mentioned do not combine sufficient internal strength with satisfactory tack when solvent energized and before setting to serve as an adhesive. It is for this reason that a film-forming material is mixed in with the resin.

Preferably there is used for this purpose a compatible polymeric film-forming material energizable by the same solvent as the partially reacted resin, such as high polymeric cellulose derivatives, vinyl derivatives or copolymers of the latter. Such materials add internal strength to the composition, improve its adhesive qualities, decrease the tendency of the resin to be absorbed into the wood, and improve the ability of the resin glue to resist shear stresses.

In accordance with the present invention, good adhesives for the purpose intended are obtained by combining the partially reacted thermo-setting resin with the polymeric film-forming material in the ratio of 97 to 60 parts of the former to 3 to 40 parts of the latter, the ratio being based on percentages by weight on a dry solids basis.

Merely by way of illustration and without limitation, several examples are given herewith of adhesives made with suitable resins and film-forming materials:

Example I

| | Percentage dry weight |
|---|---|
| Water-soluble, heat-setting phenol formaldehyde resin | 80 |
| Polyvinyl alcohol (high viscosity) | 20 |

Example II

| | |
|---|---|
| Water-soluble, heat-setting phenol formaldehyde resin | 95 |
| High viscosity methyl cellulose | 5 |

In the above examples, the adhesives are preferably prepared for application to the backing by mixing an aqueous solution of the phenol formaldehyde resin with an aqueous solution of the film-forming material.

Example III

| | Percentage dry weight |
|---|---|
| Water-soluble, heat-setting phenol formaldehyde resin | 92.5 |
| Copolymer of polyvinyl acetate and polyvinyl alcohol in equal or nearly equal molar ratios | 7.5 |

This adhesive preferably is prepared for application to the backing by mixing an aqueous solution of the phenol formaldehyde resin with an aqueous alcoholic solution of the copolymer.

Example IV

| | Percentage dry weight |
|---|---|
| Urea formaldehyde | 90 |
| Polyvinyl acetate | 10 |

This adhesive preferably is prepared for application to the backing by mixing an alcoholic solution of polyvinyl acetate with a 40% solvent solution of urea formaldehyde.

Example V

| | Percentage dry weight |
|---|---|
| Heat-setting phenol formaldehyde resin | 94.5 |
| Polyvinyl acetate | 5.5 |

In the preparation of this adhesive for application to the backing, an aqueous solution of phenol formaldehyde resin preferably is mixed with an alcoholic solution of the polyvinyl acetate.

Any suitable flexible fibrous backing may be employed in making the adhesive tape, but rope paper is preferred and excellent tapes have been made using paper of this type having a weight of the order of 14 lbs. 24x36/480, by way of example.

In the various examples given above the concentration of ingredients in aqueous solution or aqueous alcoholic solution, as the case may be, has not been given since such concentrations will vary, depending upon the character of the paper used and the type of spreading apparatus employed. However, for a tape adapted to be dispensed from a roll, the solids in solution are so regulated that the adhesive when applied to a paper backing at one side will thoroughly sink into the paper without penetrating through to the opposite side, thereby avoiding adhesion between adjacent convolutions. For a rope paper of the type mentioned, solutions having a concentration providing 1½ to 2½ ozs. per sq. yd. of solids after evaporation of the solvent will result in a tape having excellent qualities for the purpose intended. From the information given, those versed in the art should have little difficulty preparing the improved tape.

The adhesives exemplified above may be defined as solvent sensitizable, i. e., they are normally devoid of tack but are capable of being activated or energized when moistened with water or other suitable solvent to impart tackiness. The solvent preferably used with the adhesives of Examples I, II and III is water. Alcohol is preferred for energizing the adhesives of Examples IV and V.

The present invention also contemplates a tape having a pressure sensitive adhesive, i. e., one in which the adhesive is normally tacky permitting the tape to be applied to the work solely by the use of pressure. Such an adhesive may be prepared by adding to such of the compositions previously mentioned as are water-soluble, humectants, i. e., hygroscopic agents or resin solvents, such as glycols, glycerol, or lactic acid. Such materials, by absorbing moisture from the air, serve to maintain the adhesive constantly activated for immediate application to the work.

An example of such a pressure sensitive adhesive embodying the principles of this invention is as follows:

Example VI

| | Percentage dry weight |
|---|---|
| Water-soluble, heat-settable phenol formaldehyde | 70 |
| Polyvinyl alcohol (high viscosity) | 12 |
| Lactic acid | 18 |

This adhesive is prepared by mixing aqueous solutions of the formaldehyde resin and the polyvinyl alcohol with an 85% commercial lactic acid solution.

The invention also contemplates the addition of latent curing agents which at the temperature conditions encountered in the manufacture or bonding of plywood act upon the polyvinyl alcohol to render it water resistant. Aldehydes will serve for this purpose, and indeed the resin glue itself, i. e., the phenol, urea or melamine aldehydes will so act as a curing agent for polyvinyl alcohol.

All the materials mentioned in the foregoing examples are commercially available in this country. Thus, Amberlite PR23 a suitable water-soluble, thermo-setting phenol formaldehyde condensed in an alkaline medium, is produced and sold in powder form by Resinous Products and Chemical Company. A suitable high viscosity polyvinyl alcohol is produced and sold by E. I. du Pont de Nemours & Company under the designation polyvinyl alcohol RH491. A suitable polyvinyl acetate is produced and sold by Shawinigan Products Corporation under the designation Gelva V25. This material has a melting point at approximately 153° C. and a specific gravity of 1.192. A suitable urea formaldehyde which is self-emulsifying is sold by the Rohm & Haas Company in a 40% solvent solution under the name Rhonite 616.

From what has been said, it is apparent that the invention not only contributes economies insofar as the manufacture of plywood adhesive tape is concerned, but indeed contributes much by way of reducing or eliminating the bottleneck heretofore existing in the manufacture of plywood itself. As previously stated, the methods most commonly employed in the manufacture of plywood involve butt gluing the parts forming the individual plies with the aid of an adhesive tape to facilitate handling, and removing the tape after the glue has set but before laminating the plies to produce the finished plywood sheet. The improved adhesive tape, on the other hand, enables the individual plies to be built up and then laminated all in one operation, the tape forming part of the plywood structure upon completion.

The invention has been described in its preferred form and many modifications thereof are included within its spirit. It will be understood therefore that the invention is to be limited only by the prior art and the scope of the appended claims.

We claim:
1. For use in laminating plywood material, a laminating tape comprising a flexible fibrous backing impregnated throughout with an adhesive mixture which includes a major portion on a dry weight basis of a partially reacted water soluble resin selected from the group consisting of partially reacted phenol-aldehydes, urea-aldehydes, and melamine-aldehydes, a minor portion of a water soluble film-forming material for imparting internal strength and augmenting adhesiveness selected from the group consisting of high polymeric cellulose derivatives, vinyl esters, and vinyl alcohols, and a minor portion, exceeding by weight the weight of said film-forming material in the composition, of a humectant selected from the group consisting of the glycols, glycerol and lactic acid capable of absorbing moisture from the air to maintain the adhesive constantly activated for immediate use, said resin being heat-settable under the conditions of plywood bonding to enable the tape to become a water-insoluble and shear-resisting section of the finished plywood material.

2. For use in laminating plywood material, a laminating tape comprising a flexible fibrous backing impregnated throughout with an adhesive mixture which includes a major portion on a dry weight basis of a partially reacted water soluble phenol-aldehyde, a minor portion of a water soluble film-forming material for imparting internal strength and augmenting adhesiveness selected from the group consisting of high polymeric cellulose derivatives, vinyl esters, and vinyl alcohols, and a minor portion, exceeding by weight the weight of said film-forming material in the composition, of a humectant selected from the group consisting of the glycols, glycerol and lactic acid capable of absorbing moisture from the air to maintain the adhesive constantly activated for immediate use, said resin being heat settable under the conditions of plywood bonding to enable the tape to become a water-insoluble and shear-resisting section of the finished plywood material.

3. For use in laminating plywood material, a laminating tape comprising a flexible fibrous backing impregnated throughout with an adhesive mixture which includes a major portion on a dry weight basis of a partially reacted water soluble resin selected from the group consisting of partially reacted phenol-aldehydes, urea aldehydes and melamine aldehydes, a minor portion of a water soluble film-forming material for imparting internal strength and augmenting adhesiveness consisting of vinyl alcohol and a minor portion, exceeding by weight the weight of said film-forming material in the composition, of a humectant selected from the group consisting of the glycols, glycerol and lactic acid capable of absorbing moisture from the air to maintain the adhesive constantly activated for immediate use, said resin being heat-settable under the conditions of plywood bonding to enable the tape to become a water-insoluble and shear-resisting section of the finished plywood material.

CHARLES L. WEIDNER.
LASZLO WALTER EGER.

REFERENCES CITED

The following references are of record in the file of this patent:

UNITED STATES PATENTS

| Number | Name | Date |
|---|---|---|
| 2,111,006 | Robie | Mar. 15, 1938 |
| 2,142,039 | Abrams et al. | Dec. 27, 1938 |
| 2,183,330 | Drew | Dec. 12, 1939 |
| 2,233,875 | Schmidt | Mar. 4, 1941 |
| 2,237,240 | Sponsel | Apr. 1, 1941 |
| 2,297,698 | Freeman | Oct. 6, 1942 |
| 2,300,224 | Humphner | Oct. 27, 1942 |
| 2,302,309 | Glarum | Nov. 17, 1942 |
| 2,314,308 | Ellis | Mar. 16, 1943 |
| 2,322,888 | Schwartz | June 29, 1943 |
| 2,392,574 | Brown | Jan. 8, 1946 |
| 2,392,686 | Murdock | Jan. 8, 1946 |
| 2,420,366 | Geen | May 13, 1947 |

FOREIGN PATENTS

| Number | Country | Date |
|---|---|---|
| 333,194 | Great Britain | July 28, 1930 |
| 315,835 | Great Britain | Jan. 1, 1931 |